United States Patent
Lahnala

(10) Patent No.: US 9,463,684 B2
(45) Date of Patent: Oct. 11, 2016

(54) SLIDING WINDOW ASSEMBLY FOR A VEHICLE INCLUDING A FIXED PANEL HAVING AN ARCUATE CONFIGURATION AND INCLUDING A RAIL DEFINING A RAIL CHANNEL HAVING A SUBSTANTIALLY LINEAR CONFIGURATION

(71) Applicants: AGC Automotive Americas R&D, Inc., Ypsilanti, MI (US); AGC Flat Glass North America, Inc., Alpharetta, GA (US)

(72) Inventor: David W. Lahnala, Adrian, MI (US)

(73) Assignees: AGC AUTOMOTIVE AMERICAS R&D, INC., Ypsilanti, MI (US); AGC FLAT GLASS NORTH AMERICA, INC., Alpharetta, GA (US)

( * ) Notice: Subject to any disclaimer, the term of this patent is extended or adjusted under 35 U.S.C. 154(b) by 0 days.

(21) Appl. No.: 14/700,614

(22) Filed: Apr. 30, 2015

(65) Prior Publication Data
US 2015/0314672 A1 Nov. 5, 2015

Related U.S. Application Data

(60) Provisional application No. 61/986,432, filed on Apr. 30, 2014.

(51) Int. Cl.
*B60J 1/18* (2006.01)
*E05D 15/06* (2006.01)
*B60J 1/16* (2006.01)

(52) U.S. Cl.
CPC ............. *B60J 1/1853* (2013.01); *B60J 1/16* (2013.01); *B60J 1/1846* (2013.01); *B60J 1/1861* (2013.01); *E05D 15/0621* (2013.01); *E05D 15/0686* (2013.01); *E05D 15/0691* (2013.01)

(58) Field of Classification Search
CPC ........ B60J 1/16; B60J 1/1846; B60J 1/1853; B60J 1/1861
USPC ........... 296/190.1, 201, 146.16; 49/413, 380, 49/130, 408
See application file for complete search history.

(56) References Cited

U.S. PATENT DOCUMENTS

| 4,015,875 A | 4/1977 | Setina |
| 4,561,224 A | 12/1985 | Jelens |

(Continued)

OTHER PUBLICATIONS

International Search Report for Application No. PCT/US2015/028527 dated Aug. 3, 2015, 3 pages.

*Primary Examiner* — Katherine Mitchell
*Assistant Examiner* — Marcus Menezes
(74) *Attorney, Agent, or Firm* — Howard & Howard Attorneys PLLC

(57) ABSTRACT

A sliding window assembly is used with a vehicle. The sliding window assembly includes at least one fixed panel having first and second edges, with the fixed panel also having an arcuate configuration between the first and second edges. The sliding window assembly includes at least one rail coupled to the fixed panel and having first and second rail ends. The rail extends along an axis between the first and second rail ends. The rail defines a rail channel having a substantially linear configuration along the axis. The sliding window assembly includes a sliding panel at least partially disposed within the rail channel and movable along the rail and the axis relative to the fixed panel between open and closed positions. The first edge of the fixed panel is spaced from the second edge of the fixed panel along the axis that the rail extends along.

16 Claims, 13 Drawing Sheets

(56) References Cited

U.S. PATENT DOCUMENTS

| | | | | |
|---|---|---|---|---|
| 5,473,840 A | * | 12/1995 | Gillen | B60J 10/04 49/380 |
| 5,522,191 A | | 6/1996 | Wenner et al. | |
| 5,799,444 A | | 9/1998 | Freimark et al. | |
| 6,026,611 A | | 2/2000 | Ralston et al. | |
| 6,572,176 B2 | | 6/2003 | Davis et al. | |
| 7,025,405 B2 | | 4/2006 | Gillen | |
| 7,155,863 B2 | | 1/2007 | Daniel et al. | |
| 7,219,470 B2 | | 5/2007 | Lahnala | |
| 7,437,852 B2 | | 10/2008 | Dufour et al. | |
| 7,963,070 B2 | | 6/2011 | Recker | |
| 8,127,498 B2 | | 3/2012 | Lahnala | |
| 8,246,101 B2 | | 8/2012 | Cicala | |
| 8,250,812 B2 | | 8/2012 | Hebert et al. | |
| 8,272,168 B2 | * | 9/2012 | Lahnala | B60J 1/1853 49/380 |
| 8,827,347 B2 | * | 9/2014 | Snider | B60J 7/0015 160/370.22 |
| 8,915,018 B2 | | 12/2014 | Snider | |
| 9,126,474 B2 | * | 9/2015 | Cicala | B60J 1/1853 |
| 2005/0044798 A1 | * | 3/2005 | Daniel | B60J 1/1853 49/413 |
| 2005/0044799 A1 | * | 3/2005 | Kinross | B60J 1/1853 49/413 |
| 2005/0150171 A1 | * | 7/2005 | Lahnala | B60J 1/1853 49/413 |
| 2006/0107599 A1 | | 5/2006 | Luten | |
| 2008/0122262 A1 | * | 5/2008 | Cicala | B60J 1/1853 296/201 |
| 2010/0107505 A1 | | 5/2010 | Schreiner et al. | |
| 2010/0122494 A1 | * | 5/2010 | Lahnala | E05D 15/0686 49/358 |
| 2012/0091114 A1 | * | 4/2012 | Ackerman | B60J 1/1853 219/203 |
| 2012/0137593 A1 | | 6/2012 | Cicala | |
| 2013/0047513 A1 | * | 2/2013 | Lahnala | E05D 15/0686 49/168 |

\* cited by examiner

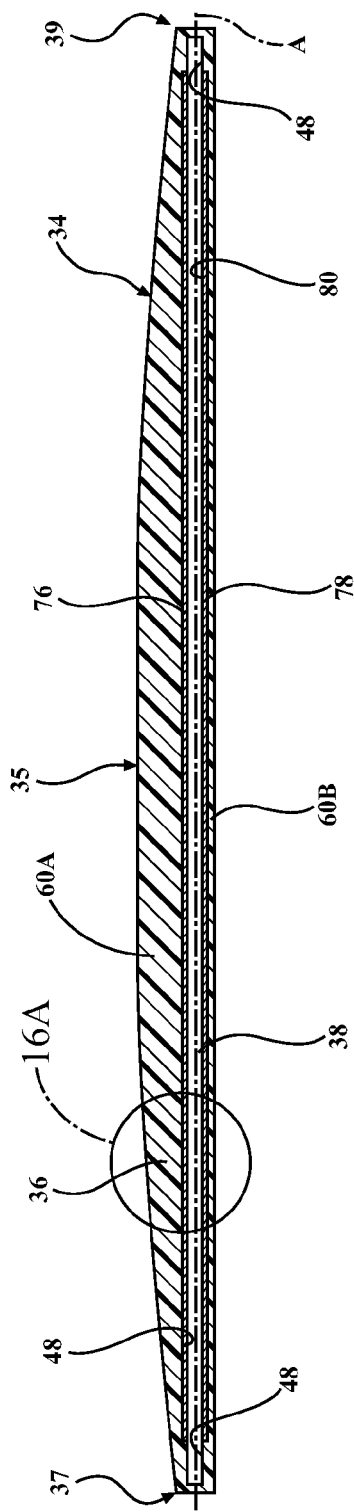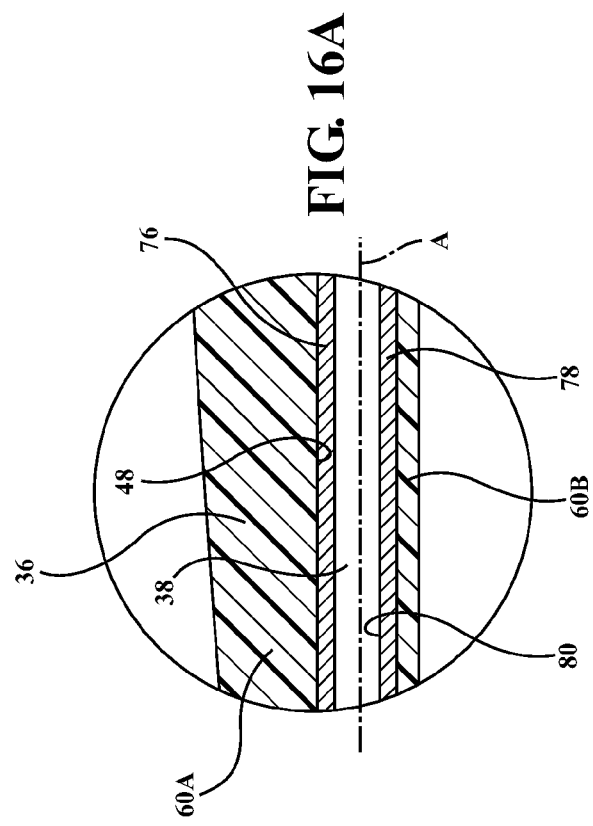
FIG. 16
FIG. 16A

SLIDING WINDOW ASSEMBLY FOR A VEHICLE INCLUDING A FIXED PANEL HAVING AN ARCUATE CONFIGURATION AND INCLUDING A RAIL DEFINING A RAIL CHANNEL HAVING A SUBSTANTIALLY LINEAR CONFIGURATION

RELATED APPLICATION

This application claims priority to and all advantages of U.S. Provisional Patent Application No. 61/986,432, which was filed on Apr. 30, 2014, the disclosure of which is specifically incorporated by reference.

BACKGROUND OF THE INVENTION

1. Field of the Invention

The invention generally relates to a sliding window assembly for a vehicle.

2. Description of Related Art

Vehicles typically include a window assembly to allow visibility of an exterior of the vehicle to a passenger within an interior of the vehicle. One example of the window assembly is a sliding window assembly which includes a fixed panel and a sliding panel. The sliding window assembly includes a pair of tracks disposed along the fixed panel. The sliding panel is movable along the pair of tracks between an open position and a closed position. The sliding window assembly defines an opening with the sliding panel covering the opening in the closed position. Typically, the fixed panel, the sliding panel, and the pair of tracks are linearly configured such that each is parallel to one another. As such, the sliding panel and the fixed panel maintain a constant spacing as the sliding panel moves along the pair of tracks.

As vehicle designs have progressed, the sliding window assembly has begun to incorporate arcuate configurations to make the sliding window assembly aesthetically-pleasing with the overall styling of the vehicle. To accommodate the arcuate configurations, the fixed panel and the tracks each have a corresponding arcuate configuration to move the sliding panel between the open and closed positions. However, production of arcuate tracks is expensive and complicates the movement of the sliding panel. Therefore, there remains a need to provide an improved sliding window assembly.

SUMMARY OF THE INVENTION AND ADVANTAGES

The subject invention provides for a sliding window assembly for a vehicle. The sliding window assembly includes at least one fixed panel adapted to be fixed to the vehicle. The fixed panel has a first edge and a second edge spaced from the first edge, with the fixed panel also having an arcuate configuration extending between the first and second edges. The sliding window assembly includes at least one rail coupled to the fixed panel and having a first rail end and a second rail end spaced from the first rail end. The rail extends along an axis between the first and second rail ends. The rail defines a rail channel having a substantially linear configuration along the axis. The sliding window assembly includes a sliding panel at least partially disposed within the rail channel and movable along the rail and the axis such that the sliding panel moves relative to the fixed panel between an open position and a closed position. The first edge of the fixed panel is spaced from the second edge of the fixed panel along the axis that the rail extends along.

Accordingly, the substantially linear configuration of the rail channel of the rail provides a cost-effective way to move the sliding panel relative to the fixed panel between the open and closed positions while providing the arcuate configuration of the fixed, which is aesthetically-pleasing with the styling of the vehicle and increases the volume of an interior of the vehicle.

BRIEF DESCRIPTION OF THE DRAWINGS

Advantages of the subject invention will be readily appreciated as the same becomes better understood by reference to the following detailed description when considered in connection with the accompanying drawings.

FIG. 16 is a cross-sectional view of the track having an elongated member and the rail taken along line 16-16 in FIG. 8.

FIG. 16A is a cross-sectional view of a portion of the track shown in FIG. 16 having the elongated member and the rail.

DETAILED DESCRIPTION OF THE INVENTION

Figure 1:
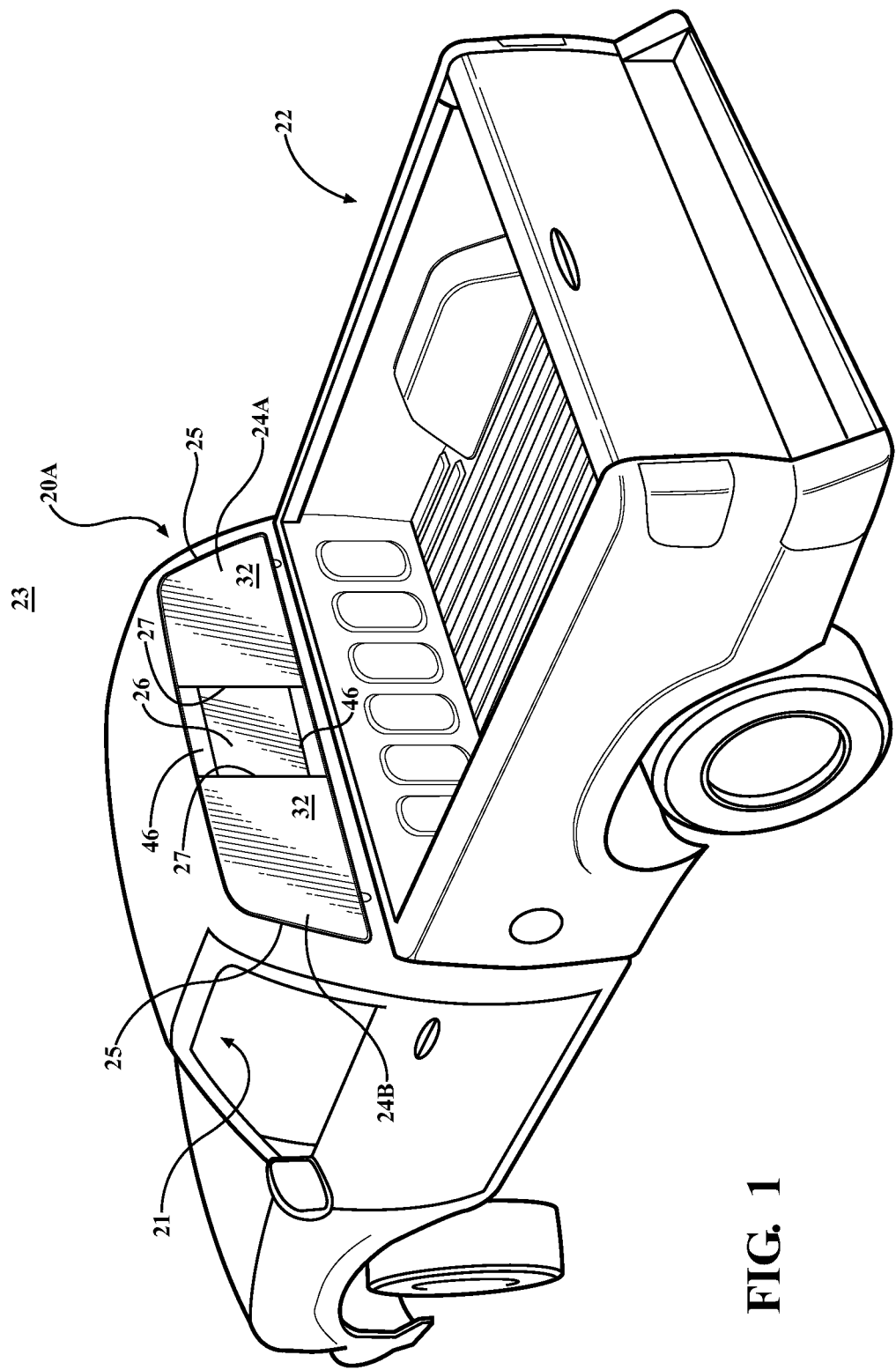
FIG. 1 is a perspective view of a three-piece sliding window assembly coupled to a vehicle.
Figure 2:
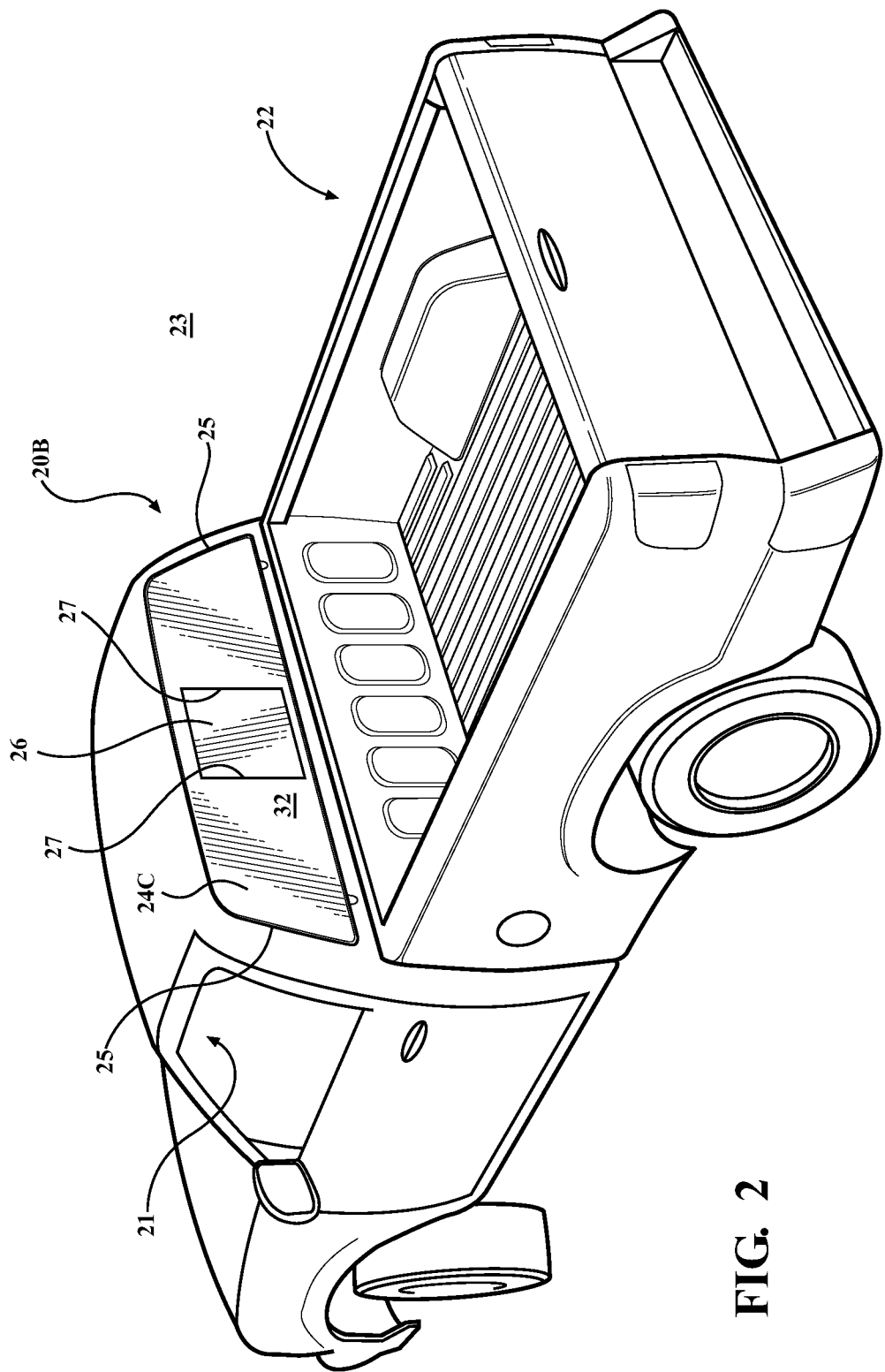
FIG. 2 is a perspective view of a two-piece sliding window assembly coupled to the vehicle.

Referring to the Figures, wherein like numerals indicate corresponding parts throughout the several views, a sliding window assembly 20A, 20B for a vehicle 22 is generally shown in FIGS. 1 and 2. As shown in the Figures, the sliding window assembly 20A, 20B is coupled to the vehicle 22, specifically as a backlite of a pickup truck. However, it is to be appreciated that the sliding window assembly 20A, 20B may be implemented in other types of vehicles, as well as in non-vehicle applications. The sliding window assembly 20A, 20B selectively separates an interior 21 of the vehicle 22 from an exterior 23 of the vehicle 22.

Figure 7:
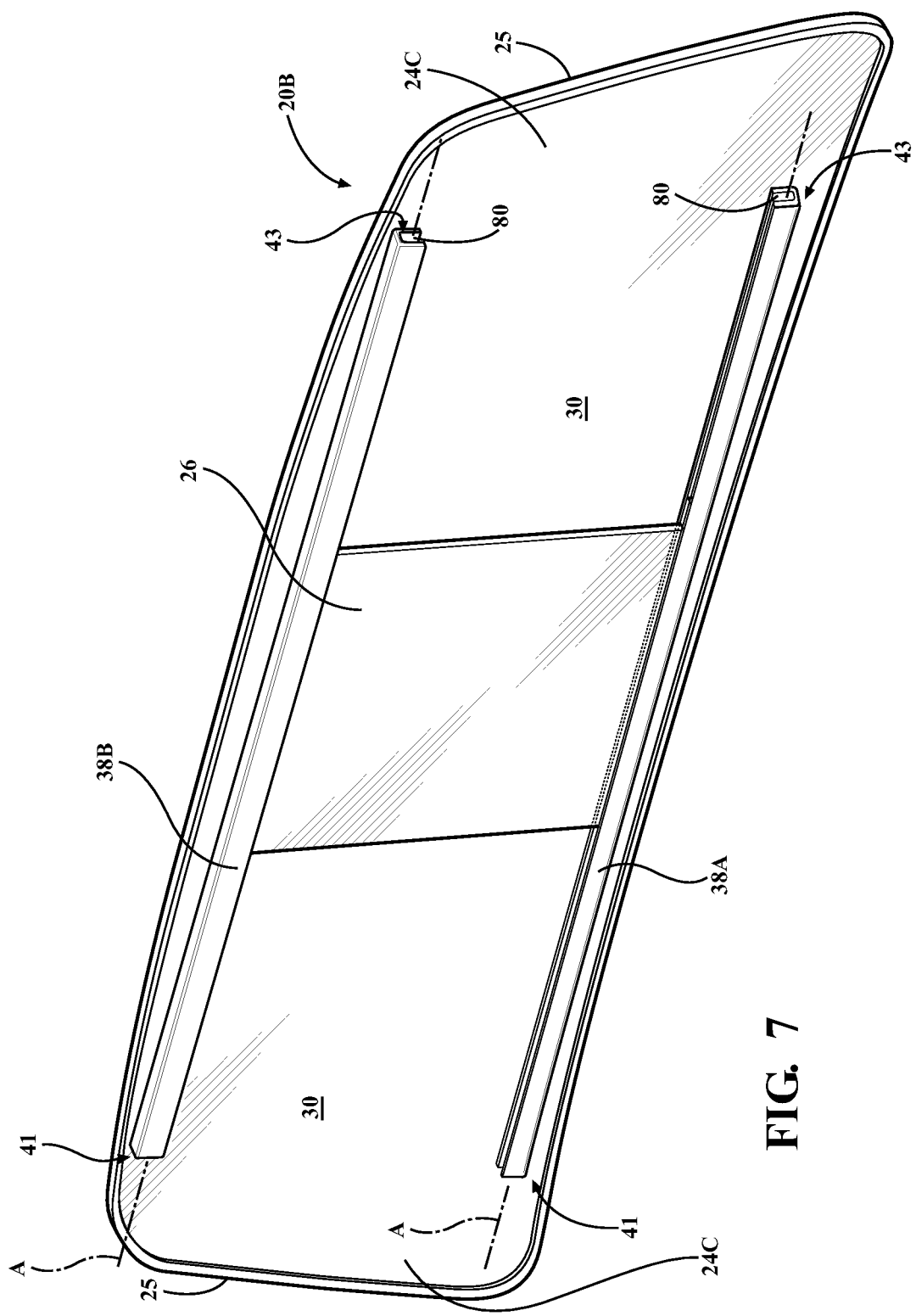
FIG. 7 is a perspective view of an interior surface of the two-piece sliding window assembly having a first rail and a second rail.

As shown in FIGS. 1-4, the sliding window assembly 20A, 20B includes at least one fixed panel 24A, 24B, 24C adapted to be fixed to the vehicle 22. The fixed panel 24A, 24B, 24C has a first edge 25 and a second edge 27 spaced from the first edge 25, with the fixed panel 24A, 24B, 24C also having an arcuate configuration extending between the first and second edges 25, 27. As shown in FIG. 7, the sliding window assembly 20A, 20B includes at least one rail 38A, 38B coupled to the fixed panel 24A, 24B, 24C and having a first rail end 41 and a second rail end 43 spaced from the first rail end 41. The rail 38A, 38B extends along an axis A between the first and second rail ends 41, 43. The rail 38A, 38B defines a rail channel 80 having a substantially linear configuration along the axis A. The sliding window assembly 20A, 20B includes a sliding panel 26 at least partially disposed within the rail channel 80 and movable along the rail 38A, 38B and the axis A such that the sliding panel 26 moves relative to the fixed panel 24A, 24B, 24C between an open position and a closed position. The first edge 25 of the fixed panel 24A, 24B, 24C is spaced from the second edge 27 of the fixed panel 24A, 24B, 24C along the axis A that the rail 38A, 38B extends along.

Figure 3:
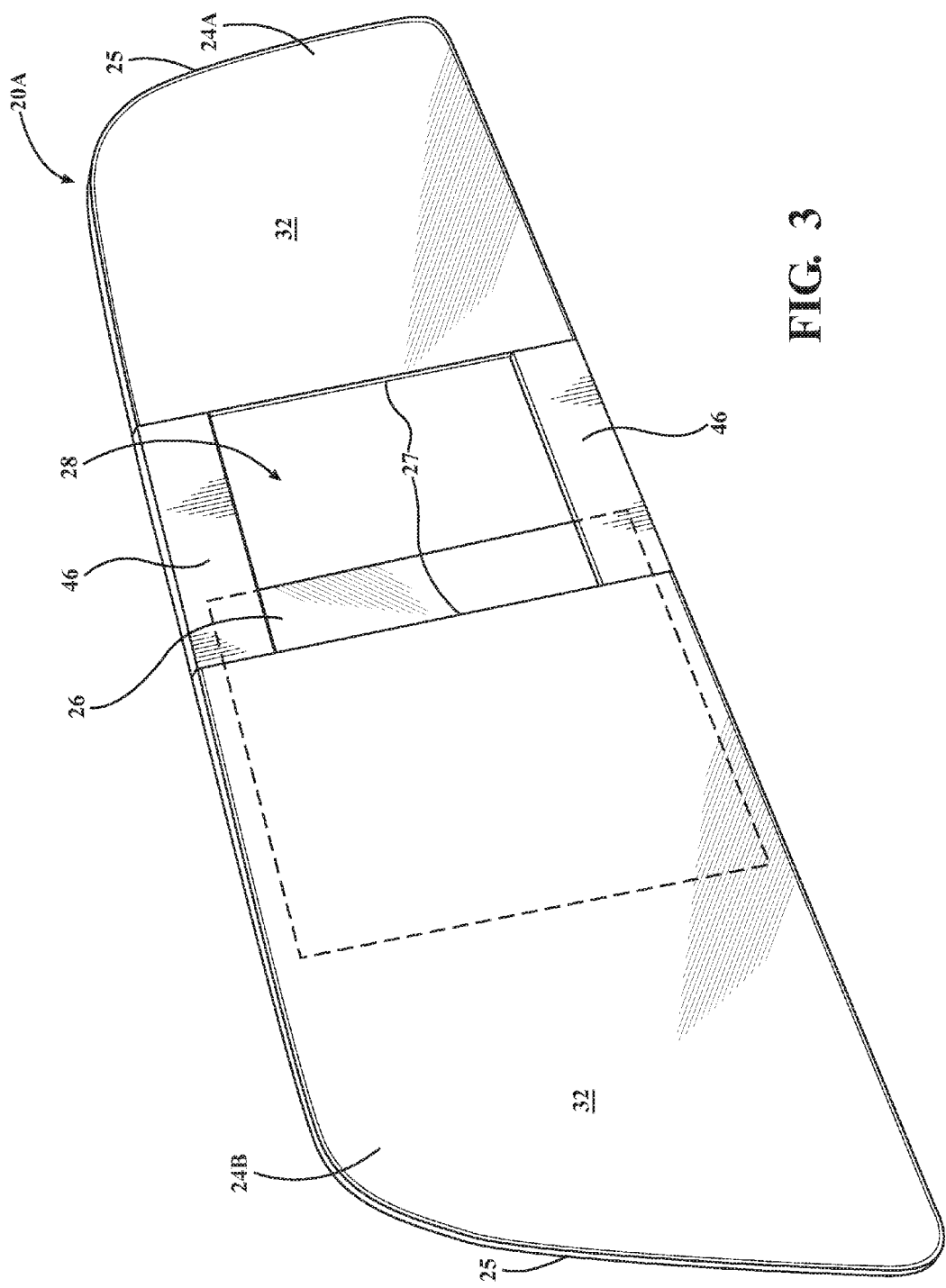
FIG. 3 is a perspective view of an exterior surface of the three-piece sliding window assembly.

As shown in FIGS. 1 and 3, the sliding window assembly 20A, 20B may be a three-piece sliding window assembly 20A, which includes the sliding panel 26. The at least one fixed panel 24A, 24B, 24C may be further defined as a first fixed panel 24A and a second fixed panel 24B spaced from said first fixed panel 24A. The second edge 27 of each of the first and second fixed panels 24A, 24B may partially define an opening 28 therebetween. Said differently, in the three-piece sliding window assembly 20A, the second fixed panel 24B is spaced from the first fixed panel 24A thereby defining the opening 28 between the second edges 27 of the first and second fixed panels 24A, 24B.

Figure 4:
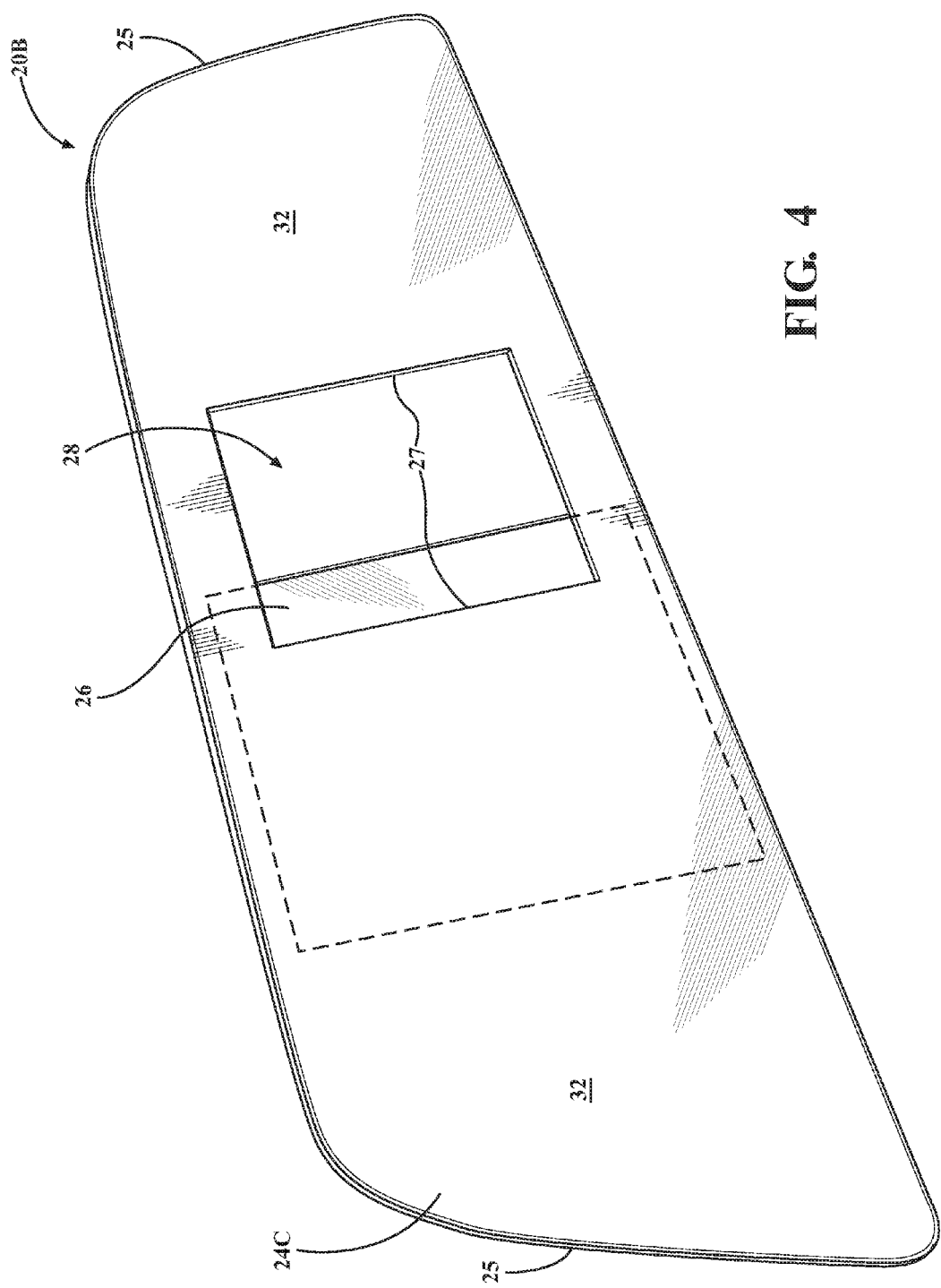
FIG. 4 is a perspective view of the exterior surface of the two-piece sliding window assembly.

Alternatively, as shown in FIGS. 2 and 4, the sliding window assembly 20A, 20B may be a two-piece sliding window assembly 20B, which includes the sliding panel 26. The at least one fixed panel 24A, 24B, 24C may be further defined as a single fixed panel 24C. The second edge of the single fixed panel 24C may define the opening 28 within the single fixed panel 24C.

It should be appreciated that the sliding window assembly 20A, 20B may include more than two fixed panels 24A, 24B without departing from the nature of the present invention. For simplicity, common features between the three-piece sliding window assembly 20A and the two-piece sliding window assembly 20B have common reference numbers. Also for simplicity, the term "sliding window assembly 20A, 20B" is used hereinafter to refer to the three-piece sliding window assembly 20A and/or the two-piece sliding window assembly 20B. For further simplicity, the term "fixed panel 24A, 24B, 24C" is used hereinafter to refer to the first and second fixed panels 24A, 24B of the three-piece sliding window assembly 20A and/or the single fixed panel 24C of the two-piece sliding window assembly 20B.

Figure 5:
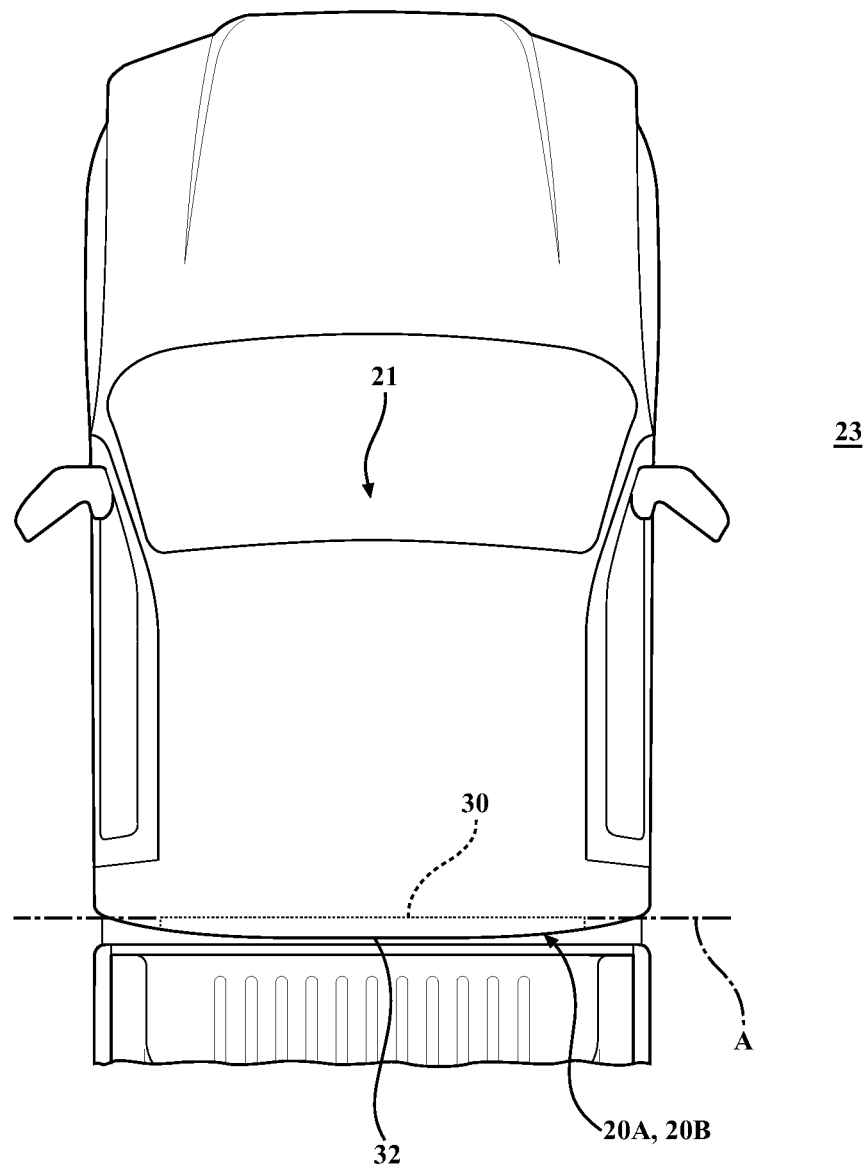
FIG. 5 is a top view of the vehicle.
Figure 6:
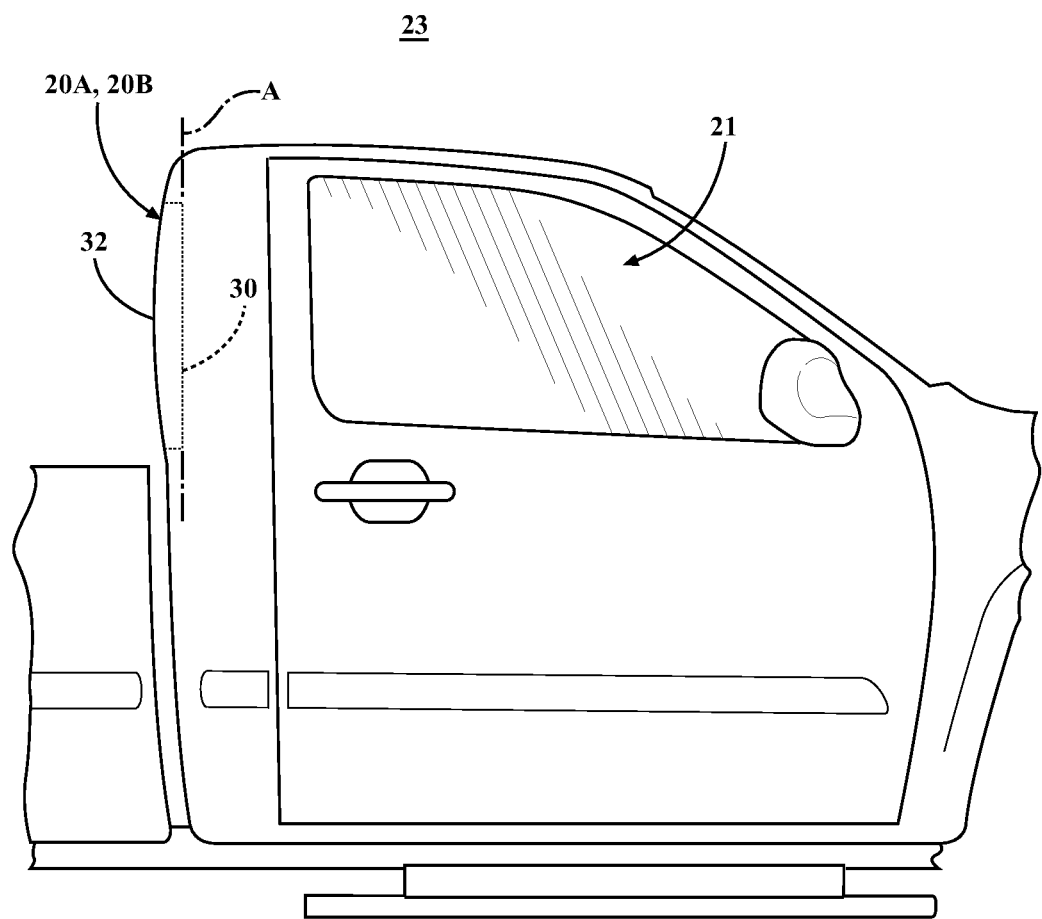
FIG. 6 is a side view of the vehicle.
Figure 8:
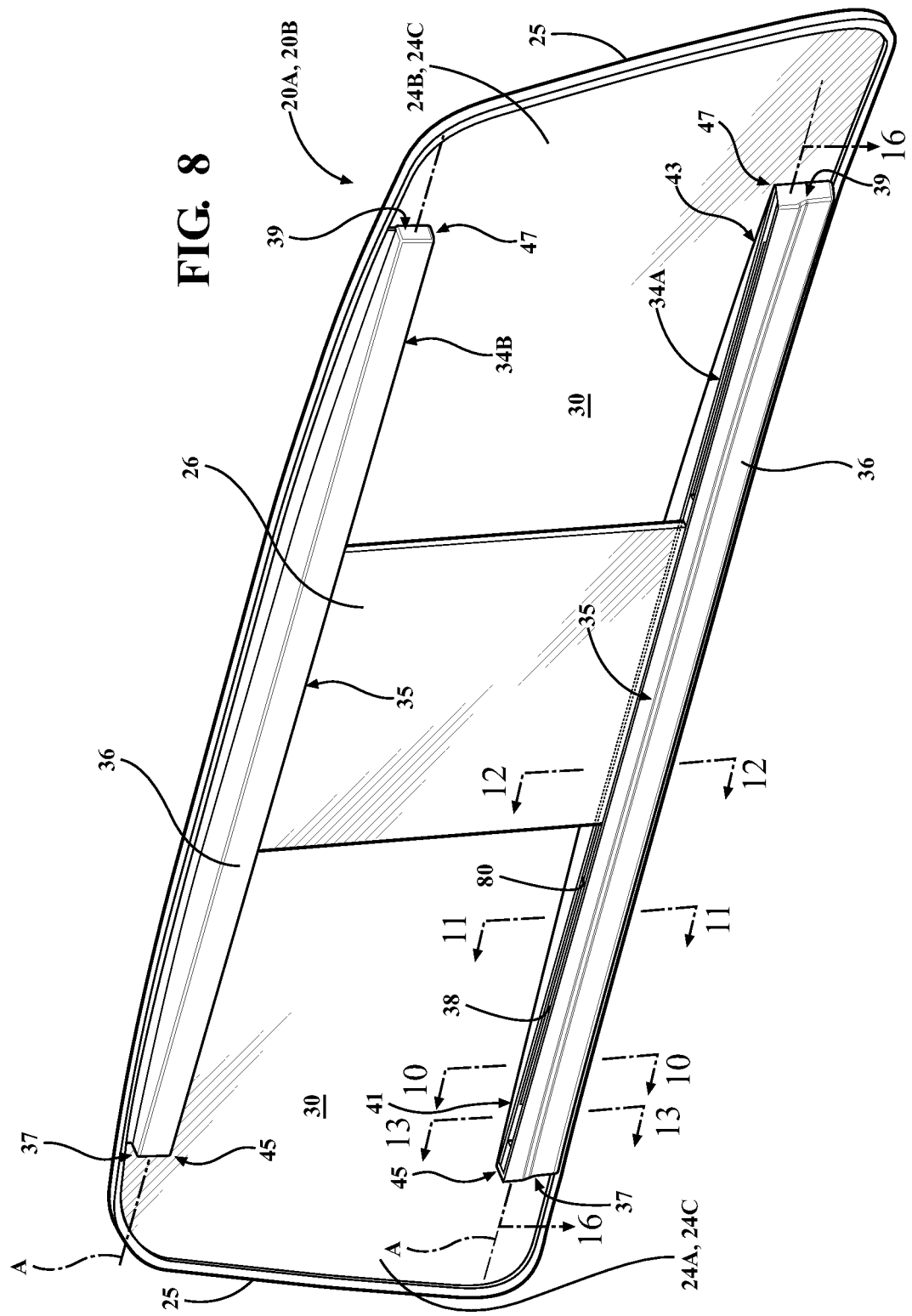
FIG. 8 is a representative perspective view of the interior surface of either the three-piece sliding window assembly or the two-piece sliding window assembly having a first track and a second track each extending along the axis that is horizontal.
Figure 9:
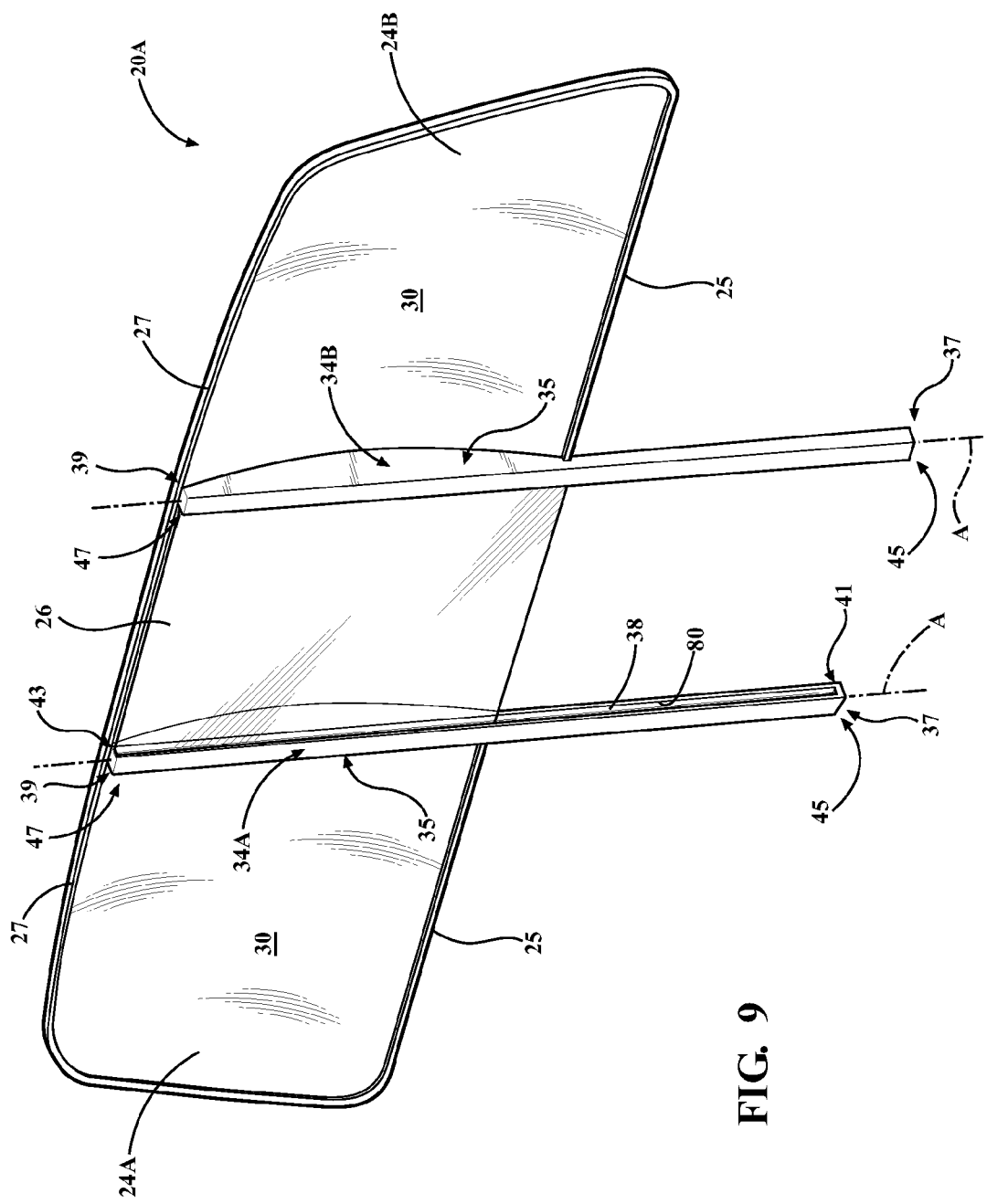
FIG. 9 is a perspective view of an interior surface of the three-piece sliding window assembly having the first track and the second track each extending along the axis that is vertical.

As shown in FIGS. 7 and 8, the axis A may be horizontal, such that the sliding window assembly 20A, 20B is a horizontal sliding window assembly. When the axis A is horizontal, the arcuate configuration of the fixed panel 24A, 24B, 24C is viewed along a horizontal plane as shown in FIG. 5. Said differently, with the axis A horizontal, the arcuate configuration of the fixed panel 24A, 24B, 24C is visible from above the vehicle 22 looking down toward the vehicle 22. Alternatively, the axis A may be vertical such that the sliding window assembly 20A, 20B is a vertical sliding window assembly, as shown in FIG. 9. When the axis A is vertical, the arcuate configuration of the fixed panel 24A, 24B, 24C is viewed along a vertical plane as shown in FIG. 6. Said differently, with the axis A vertical, the arcuate configuration of the fixed panel 24A, 24B, 24C is visible from a side of the vehicle 22 looking toward the vehicle 22. The arcuate configuration of the fixed panel 24A, 24B, 24C may be both horizontal and vertical, which is commonly referred to in the art as a "barrel curve." It is to be appreciated that when the fixed panel 24A, 24B, 24C has a barrel curve, the axis A along which the rail 38A, 38B extends may only be horizontal or may only be vertical such that the rail 38A, 38B extends only horizontally or only vertically. The fixed panel 24A, 24B, 24C having the arcuate configuration in only one of the horizontal and the vertical orientations is commonly referred to in the art as a "cylinder bend." It is to be appreciated that the arcuate configuration of the fixed panel 24A, 24B, 24C may be in any suitable orientation and in any combination of suitable orientations.

The fixed panel 24A, 24B, 24C may have the arcuate configuration such that the sliding window assembly 20A, 20B bows outwardly away from the interior 21 of the vehicle 22, as shown in FIGS. 5 and 6. Said differently, the fixed panel 24A, 24B, 24C extends furthest from the interior 21 of the vehicle 22 at the opening 28. When utilized, the arcuate configuration of the fixed panel 24A, 24B, 24C matches the overall configuration of the vehicle 22, which makes the sliding window assembly 20A, 20B aesthetically-pleasing with the styling of the vehicle 22. In addition, the application of the arcuate configuration to the fixed panel 24A, 24B, 24C increases the volume of the interior 21 of the vehicle 22, which is typically perceived as increased comfort by a user within the interior 21 of the vehicle 22 as well as increased cargo capacity within the interior 21 of the vehicle 22.

The fixed panel 24A, 24B, 24C and the sliding panel 26 may be formed of glass. However, the fixed panel 24A, 24B, 24C and the sliding panel 26 may be formed from any suitable material such as plastic, metal, etc. Generally, the fixed panel 24A, 24B, 24C is adapted to be coupled to the vehicle 22. The fixed panel 24A, 24B, 24C may have an interior surface 30 and an exterior surface 32 opposing the interior surface 30 with the rail 38A, 38B disposed along and coupled to the interior surface 30 of the fixed panel 24A, 24B, 24C. More specifically, the interior surface 30 may face an interior 21 of the vehicle 22 and the exterior surface 32 may face an exterior 23 of the vehicle 22 when the sliding window assembly 20A, 20B is coupled to the vehicle 22, such that the rail 38A, 38B is disposed within the interior 21 of the vehicle 22. FIG. 3 shows the exterior surface 32 of the three-piece sliding window assembly 20A. FIG. 4 shows the exterior surface 32 of the two-piece sliding window assembly 20B. FIG. 8 shows the interior surface 30, which is representative of both the three-piece sliding window assembly 20A and the two-piece sliding window assembly 20B.

The arcuate configuration of the fixed panel 24A, 24B, 24C is commonly determined in the industry by the amount of cross-bend in the fixed panel 24A, 24B, 24C between the first and second edges 25, 27 of the fixed panel 24A, 24B, 24C. Typically, the cross-bend of the fixed panel 24A, 24B, 24C is the difference between a measurement of the distance from the axis A to the interior surface 30 of the fixed panel 24A, 24B, 24C at the first edge 25 and a measurement of the distance from the axis A to the interior surface 30 of the fixed panel 24A, 24B, 24C at the second edge 27. Typically, the cross-bend of a fixed panel 24A, 24B, 24C having an arcuate configuration is greater than or equal to zero millimeters and less than or equal to thirty millimeters. However, it is to be appreciated that the arcuate configuration may be any amount of cross-bend.

As described above, the sliding panel 26 is moveable relative to the fixed panel 24A, 24B, 24C. The sliding panel 26 may completely cover the opening 28 in a closed position, as shown in FIGS. 1, 2, and 7-9, and may at least partially uncover the opening 28 in an open position, as shown in FIGS. 3 and 4.

The sliding panel 26 may be in an offset relationship to the fixed panel 24A, 24B, 24C. Said differently, the sliding panel 26 may be spaced from the fixed panel 24A, 24B, 24C in the closed position such that the sliding panel 26 is not disposed within the opening 28 defined by the fixed panel 24A, 24B, 24C (i.e., the sliding panel 26 is not flush with the fixed panel 24A, 24B, 24C). Further, when offset, the sliding panel 26 typically overlaps the fixed panel 24A, 24B, 24C in both the open and closed positions, which is generally shown in the Figures. Although not shown, it is to be appreciated that the sliding panel 26 may be in-line with the fixed panel 24A, 24B, 24C when the sliding panel 26 is in the closed position (i.e., the sliding panel 26 is disposed within the opening 28 defined by the fixed panel 24A, 24B, 24C such that the sliding panel 26 is flush with the fixed panel 24A, 24B, 24C) and may move into the offset relationship as the sliding panel 26 moves toward the open position. The sliding panel 26 may be manually operated for moving the sliding panel 26 relative to the fixed panel 24A, 24B, 24C. Alternatively, the sliding panel 26 may be powered for moving the sliding panel 26 by a motor operatively coupled to the sliding panel 26.

As described above and generally shown in FIG. 7, the sliding widow assembly includes the at least one rail 38A, 38B. The at least one rail 38A, 38B may be coupled to the fixed panel 24A, 24B, 24C in any suitable manner. In one embodiment shown in FIGS. 8 and 9, the sliding window assembly 20A, 20B may further include at least one track 34A, 34B coupled to the fixed panel 24A, 24B, 24C and having a first track end 37 and a second track end 39 spaced from the first track end 37, with the track 34A, 34B including the rail 38A, 38B and an elongated member 36 at least partially disposed between the fixed panel 24A, 24B, 24C and the rail 38A, 38B to couple the rail 38A, 38B to the fixed panel 24A, 24B, 24C.

The track 34A, 34B may have an intermediate portion 35 extending along the axis A between the first and second track ends 37, 39, with the elongated member 36 having a thickness T between the fixed panel 24A, 24B, 24C and the rail 38A, 38B. The thickness T may decrease from the intermediate portion 35 of the track 34A, 34B toward each of the first and second track ends 37, 39 such that the thickness T varies along the axis A to accommodate for the arcuate configuration of the fixed panel 24A, 24B, 24C between the first and second edges 25, 27. The thickness T of the elongated member 36 will be better understood through further description below.

Referring generally to FIG. 8, when the sliding window assembly 20A, 20B is the two-piece sliding window assembly 20B having the single fixed panel 24C defining the opening 28, the rail 38A, 38B may be adjacent the opening 28 with the sliding panel 26 movable relative to the single fixed panel 24C between the open and closed positions along the rail 38A, 38B and the axis A to vary a size of the opening 28. Said differently, the rail 38A, 38B may extend along the single fixed panel 24C adjacent the opening 28. Typically, the first and second rail ends 41, 43 are disposed along the fixed panel 24C opposite one another relative to the opening 28. It is to be appreciated that the rail 38A, 38B may be positioned in any suitable location relative to the opening 28 to vary the size of the opening 28.

When the sliding window assembly 20A, 20B is the three-piece sliding window assembly 20A, the rail 38A, 38B may be coupled to each of the first and second fixed panels 24A, 24B with the sliding panel 26 movable relative to the first and second fixed panels 24A, 24B between the open and closed positions along the rail 38A, 38B and the axis A to vary a size of the opening 28. The rail 38A, 38B may extend between the first and second fixed panels 24A, 24B and across the opening 28 to facilitate the movability of the sliding panel 26 relative to the first and second fixed panels 24A, 24B between the open and closed positions along the rail 38A, 38B and the axis A to vary the size of the opening 28. Said differently, the rail 38A, 38B may span the opening 28 with the first rail end 41 adjacent the first fixed panel 24A and the second rail end 43 adjacent the second fixed panel 24B. It is to be appreciated that the at least one rail 38A, 38B may rigidly interconnect the first and second fixed panels 24A, 24B. It is also to be appreciated that the rail 38A, 38B may be positioned in any suitable location relative to the opening 28 to vary the size of the opening 28.

As shown in FIGS. 7 and 8, the at least one rail 38A, 38B may be further defined as a first rail 38A coupled to the fixed panel 24A, 24B, 24C and a second rail 38B coupled to the fixed panel 24A, 24B, 24C spaced from and substantially parallel to the first rail 38A with the sliding panel 26 at least partially disposed within the rail channel 80 of each of the first and second rails 38A, 38B. Furthermore, when present as shown in FIG. 8, the at least one track 34A, 34B may be further defined as a first track 34A coupled to the fixed panel 24A, 24B, 24C and a second track 34B coupled to the fixed panel 24A, 24B, 24C spaced from and substantially parallel to the first track 34A.

The first and second rails 38A, 38B may be horizontal as described above and shown in FIGS. 7 and 8. When horizontal, the first rail 38A is typically the bottom rail and the second rail 38B is the top rail, or vice versa. The first and second rails 38A, 38B may be vertical, as described above and shown in FIG. 9. When vertical, the first rail 38A is the left rail and the second rail 38B is the right rail, or vice versa. For simplicity, common features between the first and second rails 38A, 38B have common reference numbers and only the first rail 38A is described in detail below and is hereinafter referred to as the rail 38. Likewise, common features between the first and second tracks 34A, 34B have common reference numbers and only the first track 34A is described in detail below and is hereinafter referred to as the track 34.

The sliding panel 26 typically slides horizontally (as shown in FIGS. 7 and 8) or vertically (as shown in FIG. 9) along the rail 38, but it should be appreciated that the sliding panel 26 may also slide in other directions. It should also be appreciated that the sliding panel 26 may slide in more than one direction from the closed position to the open position. Typically, when the sliding panel 26 is moveable horizontally, the rail 38 is horizontal as described above and shown in FIGS. 7 and 8. Alternatively, when the sliding panel 26 is moveable vertically, the rail 38 is vertical as described above and shown in FIG. 9.

Figures 10, 11:
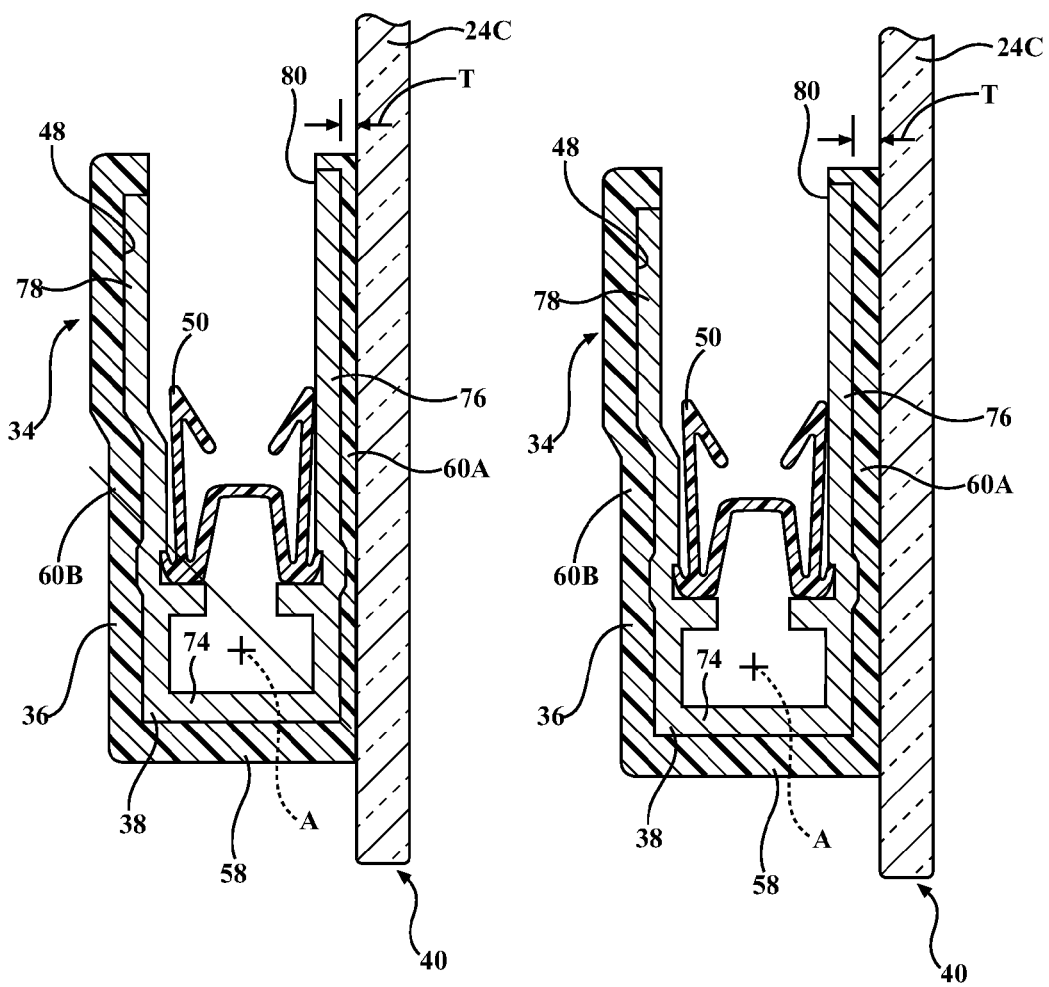
FIG. 10 is a cross-sectional view of a portion of the two-piece sliding window assembly taken along line 10-10 in FIG. 8.
FIG. 11 is a cross-sectional view of a portion of the two-piece sliding window assembly taken along line 11-11 in FIG. 8.
Figures 12, 13:
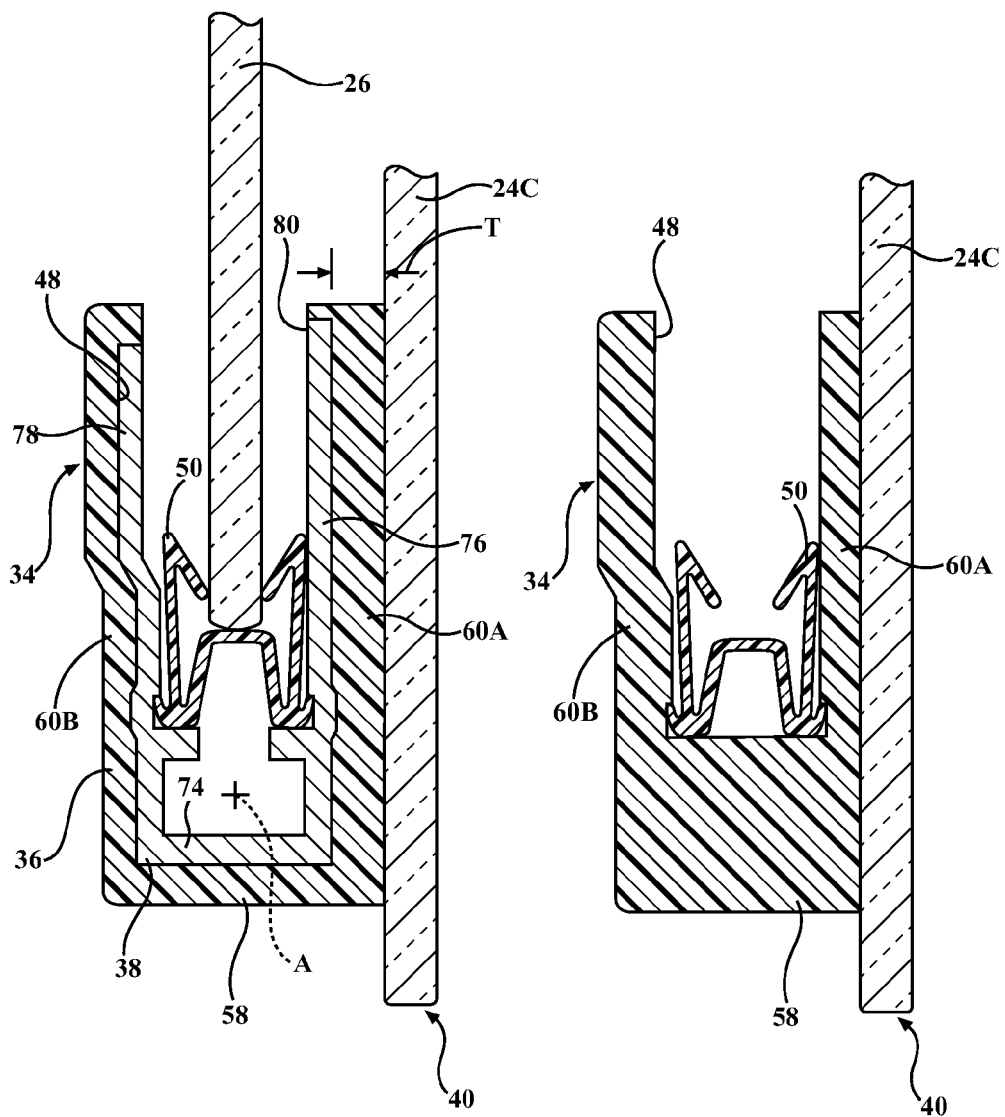
FIG. 12 is a cross-sectional view of a portion of the two-piece sliding window assembly taken along line 12-12 in FIG. 8.
FIG. 13 is a cross-sectional view of a portion of the two-piece sliding window assembly taken along line 13-13 in FIG. 8.

As described above and shown in FIGS. 7-9, the track 34 includes the elongated member 36. The elongated member 36 is coupled to the fixed panel 24A, 24B, 24C, which couples the rail 38 to the fixed panel 24A, 24B, 24C. The elongated member 36 may define a member channel 48 having a substantially linear configuration along the axis A with the rail 38 at least partially disposed within the member channel 48, as shown in FIGS. 10-12. The rail 38 is typically entirely disposed within the member channel 48; however, it is to be appreciated that a portion of the rail 38 may extend out of the member channel 48.

The elongated member 36 may have a base portion 58 and first and second opposing legs 60A, 60B extending from the base portion 58 to define the member channel 48. The second opposing leg 60B may be spaced from the first opposing leg 60A and extend in the same direction substantially parallel to one another such that the member channel 48 has a U-shaped cross-sectional configuration. It is to be appreciated the member channel 48 may have any suitable configuration.

The first opposing leg 60A of the elongated member 36 may be at least partially disposed between the fixed panel 24A, 24B, 24C and the rail 38 to couple the rail 38 to the fixed panel 24A, 24B, 24C. The elongated member 36 may be coupled to the fixed panel 24A, 24B, 24C by adhesive surface bonding. Moreover, the elongated member 36 may be an encapsulation. The encapsulation may formed be a process referred to in the industry as glass encapsulation. The glass encapsulation process may be further defined as single-sided glass encapsulation, two-sided glass encapsulation, or three-sided glass encapsulation. For example, with single-sided glass encapsulation, the track 34 is coupled to the interior surface 30 of the fixed panel 24A, 24B, 24C leaving the exterior surface 32 of the fixed panel 24A, 24B, 24C free of the adhesive surface bonding. In the embodiment shown in the Figures, the track 34 is coupled to the fixed panel 24A, 24B, 24C by single-sided glass encapsulation. It should be appreciated that the adhesive surface bonding may be any type of adhesive surface bonding other than glass encapsulation without departing from the nature of the present invention.

In glass encapsulation, an encapsulation material forms at least a portion of the track 34 and connects the track 34 to the fixed panel 24A, 24B, 24C. Specifically, the elongated member 36 is formed of the encapsulation material and is therefore coupled to the fixed panel 24A, 24B, 24C by glass encapsulation. The encapsulation material is typically introduced to the fixed panel 24A, 24B, 24C in molten form and solidifies in the presence of the fixed panel 24A, 24B, 24C to form the elongated member 36 of the track 34. As such, the track 34 is at least partially formed of the encapsulated material, i.e., encapsulation material that was formed into the shape of the elongated member 36 in the molten state and allowed to solidify during the glass encapsulation process. The encapsulation material is typically polyvinyl chloride (PVC). However, it should be appreciated that the encapsulation material may be formed from any type of material suitable for glass encapsulation, including but not limited to reaction injection molded urethane (RIM Urethane) and styrene-ethylene/butylene-styrene (SEBS).

Figures 14, 15:
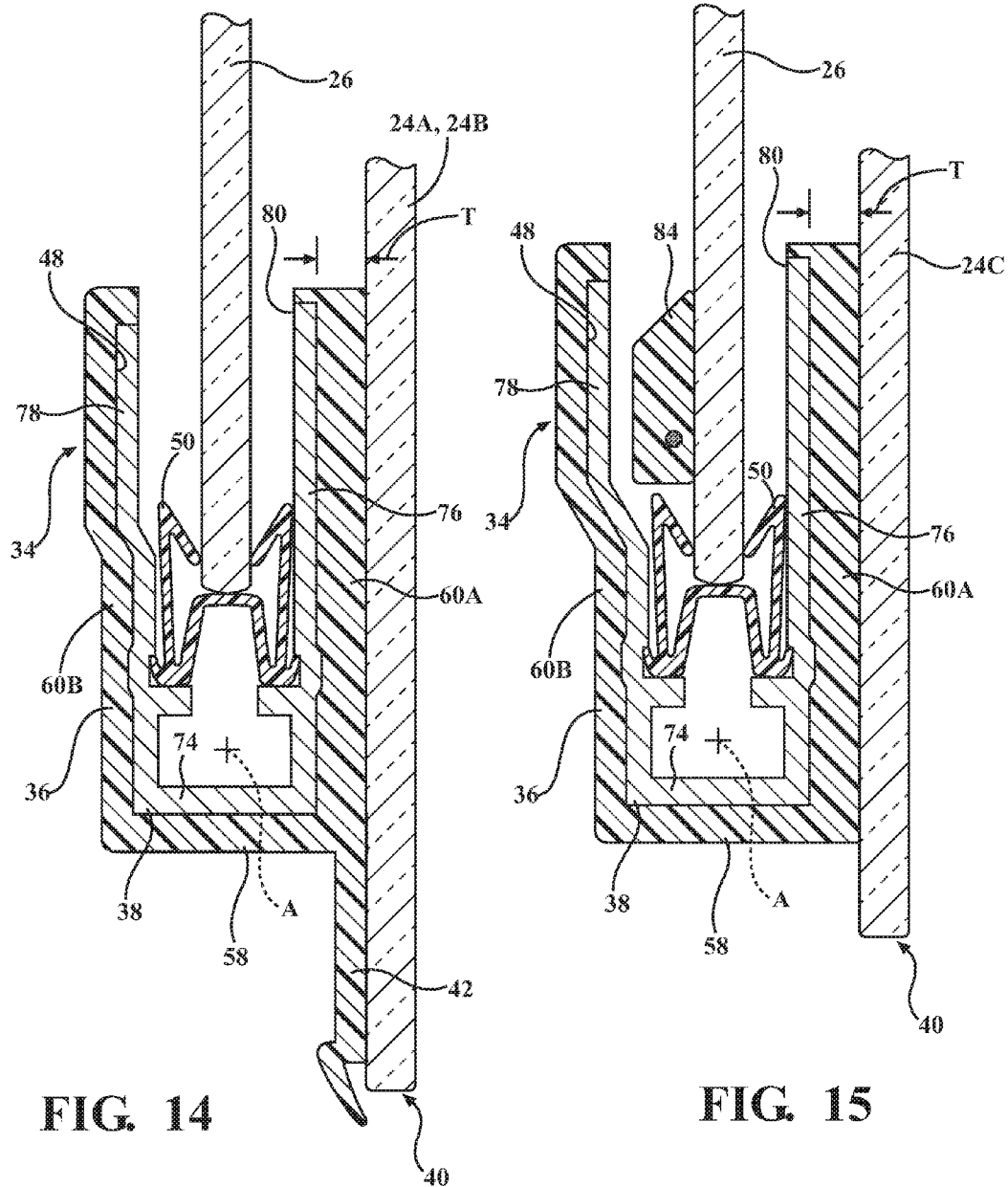
FIG. 14 is a representative cross-sectional view of a portion of the three-piece sliding window assembly.
FIG. 15 is a representative cross-sectional view of a portion of either the three-piece sliding window assembly or the two-piece sliding window assembly having a coupler for a motor.

As shown in FIGS. 10-12, when the sliding window assembly 20A, 20B is the two-piece sliding window assembly 20B, the elongated member 36 is spaced from a perimeter 40 of the single fixed panel 24C for exposing a portion of the single fixed panel 24C about an entire periphery of the single fixed panel 24C and thus an entire periphery of the sliding window assembly 20B. Exposing the entire periphery allows the single fixed panel 24C to be directly adhered to a flange on the vehicle 22. The elongated member 36 may have an attachment stem 42 extending from the first opposing leg 60A, with the rail 38 coupled to the fixed panel 24A, 24B, 24C at the attachment stem 42, as shown in FIG. 14. Such a configuration is typical when the sliding window assembly 20A, 20B is the three-piece sliding window assembly 20A, with the attachment stem 42 providing a bonding surface to receive the adhesive to bond the first and second fixed panels 24A, 24B to the flange of the vehicle 22. The attachment stem 42 may extend from the base portion 58 of the elongated member 36 opposite the first opposing leg 60A. However, it is to be appreciated that the attachment stem 42 may extend in any suitable direction. Typically, the attachment stem 42 is integral with the base portion 58 and the first and second opposing legs 60A, 60B. However, it is to be appreciated that the attachment stem 42 may be an individual component.

As shown in FIG. 3, in the three-piece sliding window assembly 20A, the first and second fixed panels 24A, 24B may not extend about the entire periphery of the sliding window assembly 20A, 20B. As such, the bonding surface of the attachment stem 42 of the elongated member 36 may be an extension of the first and second fixed panels 24A, 24B for allowing the first and second fixed panels 24A, 24B to be bonded to the vehicle 22 at the opening 28. In the three-piece sliding window assembly 20A an appliqué 46 may be used to cover the elongated member 36 exposed between the first and second fixed panels 24A, 24B.

As shown in FIGS. 8, 9, and 16, the elongated member 36 may have a first member end 45 and a second member end 47 spaced from the first member end 45. Each of the first rail end 41 of the rail 38 and the first member end 45 of the elongated member 36 may be positioned at the first track end 37 of the track 34, which is generally shown in FIG. 9 and representative of the track 34 when horizontal. Likewise, the second rail end 43 of the rail 38 and the second member end 47 of the elongated member 36 may be positioned at the second end of the track 34. Alternatively, as shown in FIGS. 8, 13, and 16, at least one of the first and second member ends 45, 47 may extend beyond at least one of the first and second rail ends 41, 43 of the rail 38, respectively, to define the one of the first and second track ends 37, 39 of the track 34, respectively, such that the member channel 48 of the elongated member 36 is aligned with and opens into the rail channel 80 of the rail 38 with the sliding panel 26 movable along the axis A within each of the rail channel 80 and the member channel 48. Said differently, the first and second rail ends 41, 43 of the rail 38 may be spaced from each of the first and second track ends 37, 39 of the track 34 such that the member channel 48 of the elongated member 36 may be an extension of the rail channel 80 of the rail 38 with the sliding panel 26 movable between the open and closed positions within both the rail channel 80 and the member channel 48. In other words, the rail 38 may shortened relative to the overall length of the track 34. Such a configuration allows the sliding panel 26 to come closer to the fixed panel 24A, 24B, 24C at the track ends. This is because the rail 38 has a thickness and is typically made of a material (which will be described in greater detail below) that requires machining in order to alter the profile of the rail 38. As such, when the rail ends 41, 43 abut the fixed panel 24A, 24B, 24C, the rail channel 80 is spaced from the fixed panel 24A, 24B, 24C at the rail ends 41, 43 by the thickness of the rail 38. When the rail 38 is shortened, the elongated member 36, which is typically a molded encapsulation as described above, may be molded such that the member channel 48 becomes close to, if not open up against, the fixed panel 24A, 24B, 24C. In doing so, the axis A and the sliding panel 26 may be brought closer to the fixed panel 24A, 24B, 24C, which reduces a gap between the sliding panel 26 and the fixed panel 24A, 24B, 24C in the closed position caused by the offset of the sliding panel 26 relative to the fixed panel 24A, 24B, 24C as described above, It is to be appreciated that in another embodiment, the rail 38 may not be shortened relative to the overall length of the track 34. Instead the rail ends 41, 43 of the rail 38 may be beveled (or shaped in any other suitable configuration) by machining (or any other suitable process) to bring the axis A (and the sliding panel 26) closer to the fixed panel 24A, 24B, 24C to reduce the gap between the sliding panel 26 and the fixed panel 24A, 24B, 24C in the closed position caused by the offset of the sliding panel 26 relative to the fixed panel 24A, 24B, 24C.

As shown in FIGS. 10-12, the rail 38 may have a bottom wall 74 and first and second opposing walls 76, 78 extending from the bottom wall 74 such that the rail 38 has a substantially U-shaped configuration with the bottom wall 74 and the first and second opposing walls 76, 78 defining the rail channel 80. The first opposing wall 76 of the rail 38 may be adjacent the first opposing leg 60A of the elongated member 36, the second opposing wall 78 of the rail 38 may be spaced from the first opposing wall 76 and adjacent the second opposing leg 60B of the elongated member 36, and the bottom wall 74 of the rail 38 may be adjacent the base portion 58 of the elongated member 36. However, it is to be appreciated that the bottom wall 74 and first and second opposing walls 76, 78 of the rail 38 may be positioned in any suitable location relative to the base portion 58 and the first and second opposing legs 60A, 60B of the elongated member 36.

The rail 38 may be rigid relative to the elongated member 36 to structurally reinforce the elongated member 36. The structural reinforcement of the elongated member 36 by the rail 38 refers to the rails 38 ability to increase the flexural modulus of the elongated member 36. The rail 38 may be formed of a material having a greater resistance to wear than the elongated member 36 for improving the longevity of the track 34 as the sliding panel 26 moves between the open and closed positions. The rail 38 is typically formed of metal, such as aluminum; however, it is to be appreciated that the rail 38 may be formed of any suitable material, including but not limited to polybutylene terephthalate (PBT).

The first opposing leg 60A of the elongated member 36 may be disposed between the first opposing wall 76 of the rail 38 and the fixed panel 24A, 24B, 24C. As described above, the first opposing leg 60A may be coupled to the fixed panel 24A, 24B, 24C and the rail 38 may be coupled to the elongated member 36. Therefore, the rail 38 may be coupled to the fixed panel 24A, 24B, 24C by the first opposing leg 60A of the elongated member 36. It is to be appreciated that second opposing leg 60B and/or the base portion 58 of the elongated member 36 may be disposed between the at least one fixed panel 24A, 24B, 24C and the rail 38 to couple the rail 38 to the fixed panel 24A, 24B, 24C.

As described above, the elongated member 36 may have the thickness T between the fixed panel 24A, 24B, 24C and the rail 38 with the thickness T decreasing from the intermediate portion 35 toward each of the first and second track ends 37, 39 such that the thickness T varies along the axis A to accommodate for the arcuate configuration of the fixed panel 24A, 24B, 24C between the first and second edges 25, 27. As further described above, the elongated member 36 may be an encapsulation. As such, the thickness T of the elongated member 36 is commonly referred to in the industry as an "encapsulation profile."

FIGS. 10-12 depict cross-sections of the track 34 and the single fixed panel 24C of the two-piece sliding window assembly 20B. However, it is to be appreciated that FIGS. 10-12 are representative of cross-sections of the track 34 and the first and second fixed panels 24A, 24B of the three-piece sliding window assembly 20A. As such, further reference to the sliding window assembly 20A, 20B refers to both the three-piece sliding window assembly 20A and the two-piece sliding window assembly 20B. Furthermore, the cross-sections depicted in FIGS. 10-12 are also representative of cross-sections of the track 34 adjacent the fixed panel 24A, 24B, 24C with the axis A vertical as shown in FIG. 9.

FIG. 8 shows that the cross-sections depicted in FIGS. 10-12 are at varying locations along the axis A of the track 34, with the cross-section depicted in FIG. 10 proximate the first track end 37 of the track 34, with the cross-section depicted in FIG. 12 proximate the intermediate portion 35 of the track 34, and with the cross-section depicted in FIG. 11 between the cross-sections depicted in FIGS. 10 and 12.

As described above, the rail 38 extends along the axis A. The rail 38 and the fixed panel 24A, 24B, 24C define a space therebetween. As further described above, the rail 38 extends along the axis A between the first and second rail ends 41, 43 and defines the rail channel 80 having the substantially linear configuration. The fixed panel 24A, 24B, 24C has the arcuate configuration extending between the first and second edges 25, 27 with the first edge 25 of the fixed panel 24A, 24B, 24C spaced from the second edge 27 of the fixed panel 24A, 24B, 24C along the axis A that the rail 38 extends along. The differing configurations of the rail 38 and the fixed panel 24A, 24B, 24C (i.e., the extension of the rail 38 along the axis A and arcuate configuration of the fixed panel 24A, 24B, 24C) results in the space between the rail 38 and the fixed panel 24A, 24B, 24C varying along the axis A. The thickness T of the first opposing leg 60A between the rail 38 and the fixed panel 24A, 24B, 24C is equal to the space between the rail 38 and the fixed panel 24A, 24B, 24C. Therefore, the thickness T of the first opposing leg 60A varies along the axis A. Said differently, the first opposing leg 60A fills the space between the rail 38 and the fixed panel 24A, 24B, 24C to maintain the substantially linear configuration of the rail 38 and the arcuate configuration of the fixed panel 24A, 24B, 24C.

FIGS. 10-12 illustrate the varying thickness T of the first opposing leg 60A between the rail 38 and the fixed panel 24A, 24B, 24C. More specifically, the thickness T of the first opposing leg 60A progressively increases from FIG. 10 to FIG. 11 and from FIG. 11 to FIG. 12. FIGS. 16 and 16A are further representations of the thickness T of the first opposing leg 60A varying along the axis A. The thickness T of the first opposing leg 60A in FIG. 10 is representative of the true thickness T of the first opposing leg 60A along the axis A proximate the first track end 37 of the track 34. The thickness T of the first opposing leg 60A shown in FIGS. 11 and 12 is exaggerated from the actual thickness T of the first opposing leg 60A along the axis A at FIGS. 11 and 12. The exaggeration in the thickness T of the first opposing leg 60A is also shown in FIGS. 16 and 16A. The increase in the thickness T of the first opposing leg 60A from FIG. 10 to FIG. 11, from FIG. 11 to FIG. 12, and generally shown in FIGS. 16 and 16A, has been exaggerated to better show the variation in the thickness T along the axis A. It is to be appreciated that the arcuate configuration of the track 34 in the first direction is gradual such that the thickness T of the first opposing leg 60A between the rail 38 and the fixed panel 24A, 24B, 24C increases gradually toward the intermediate portion 35. It is also to be appreciated that although the thickness T of the first opposing leg 60A has been illustrated between the first track end 37 and the intermediate portion 35, the increase in the thickness T from the first track end 37 toward the intermediate portion 35 may be applied to the first opposing leg 60A from the second track end 39 toward the intermediate portion 35.

As described above, the thickness T of the first opposing leg 60A may be varied to fill the space between the rail 38 and the fixed panel 24A, 24B, 24C to maintain extension of the rail 38 along the axis A and the arcuate configuration of the fixed panel 24A, 24B, 24C. As a result, the sliding window assembly 20A, 20B is able to incorporate the arcuate configuration of the fixed panel 24A, 24B, 24C, which is aesthetically-pleasing with the overall styling of the vehicle 22, while allowing the sliding panel 26 to move between the open and closed positions to cover and uncover the opening 28. Further, the varying of the thickness T of the first opposing leg 60A ensures constant contact between the rail 38 and the fixed panel 24A, 24B, 24C along the entire length of the rail 38, which helps to prevent rattling of the rail 38 and deflection of the rail 38 relative to the fixed panel 24A, 24B, 24C.

As described above, the sliding panel 26 may be powered for moving the sliding panel 26 by a motor operatively coupled to the sliding panel 26. When the sliding panel 26 is powered, the track 34 may be modified by flaring the second opposing leg 60B of the elongated member away from the sliding panel 26 to allow a coupler 84 to be attached to the sliding panel 26 to couple the sliding panel 26 to the motor to effectuate movement of the sliding panel 26, as shown in FIG. 15.

As shown in FIGS. 10-15, the sliding window assembly 20A, 20B may further include an insert 50, which is commonly referred to in the industry as a run channel. The insert 50 may be disposed in the rail channel 80 of the rail 38 between the rail 38 and the sliding panel 26 to reduce friction as the sliding panel 26 moves relative to the fixed panel 24A, 24B, 24C. Typically, the insert 50 remains stationary as the sliding panel 26 moves along the insert 50. However, it is to be appreciated that the insert 50 may move with the sliding panel 26 such that the insert 50 moves along the elongated member 36, or, if present, the rail 38.

Because the sliding panel 26 is movable within the rail channel 80 and along the rail 38 and the axis A, the sliding panel 26 is typically offset and spaced from the fixed panel 24A, 24B, 24C in the closed position such that the gap is present, as described above. To seal between the sliding panel 26 and the fixed panel 24A, 24B, 24C, the sliding window assembly 20A, 20B may include at least one compressible seal disposed on the fixed panel 24A, 24B, 24C and abutting the sliding panel 26 to seal between the sliding panel 26 and the fixed panel 24A, 24B, 24C.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A sliding window assembly for a vehicle, said sliding window assembly comprising:
   at least one fixed panel adapted to be fixed to the vehicle and having a first edge and a second edge spaced from said first edge, with said fixed panel having an arcuate configuration about a horizontal axis of curvature and with said fixed panel also having an arcuate configuration about a vertical axis of curvature, with said horizontal axis of curvature being substantially orthogonal to said vertical axis of curvature;
   at least one rail coupled to said fixed panel and having a first rail end and a second rail end spaced from said first rail end, with said rail extending along a rail axis between said first and second rail ends, and with said rail defining a rail channel having a substantially linear configuration along said axis; and
   a sliding panel at least partially disposed within said rail channel and movable along said rail and said axis such that said sliding panel moves relative to said fixed panel between an open position and a closed position;
   wherein said first edge of said fixed panel is spaced from said second edge of said fixed panel along said axis that said rail extends along.

2. The sliding window assembly as set forth in claim 1 further including at least one track coupled to said fixed panel and having a first track end and a second track end spaced from said first track end, with said track including said rail and an elongated member at least partially disposed between said fixed panel and said rail to couple said rail to said fixed panel.

3. The sliding window assembly as set forth in claim 2 wherein said track has an intermediate portion extending along said rail axis between said first and second track ends, with said elongated member having a thickness between said fixed panel and said rail, and with said thickness decreasing from said intermediate portion of said track toward each of said first and second track ends such that said thickness varies along said rail axis to accommodate for said arcuate configuration of said fixed panel between said first and second edges.

4. The sliding window assembly as set forth in claim 2 wherein said elongated member defines a member channel having a substantially linear configuration along said raid axis with said rail at least partially disposed within said member channel.

5. The sliding window assembly as set forth in claim 4 wherein said elongated member has a base portion and first and second opposing legs extending from said base portion to define said member channel with said first opposing leg of said elongated member at least partially disposed between said fixed panel and said rail to couple said rail to said fixed panel.

6. The sliding window assembly as set forth in claim 5 wherein said elongated member has an attachment stem extending from said first opposing leg, with said rail coupled to said fixed panel at said attachment stem.

7. The sliding window assembly as set forth in claim 4 wherein said elongated member has a first member end and a second member end spaced from said first member end, and wherein at least one of said first and second member ends extends beyond at least one of said first and second rail ends of said rail, respectively, to define said one of said first and second track ends of said track, respectively, such that said member channel of said elongated member is aligned with and opens into said rail channel of said rail with said sliding panel movable along said raid axis within each of said rail channel and said member channel.

8. The sliding window assembly as set forth in claim 2 wherein said elongated member is an encapsulation.

9. The sliding window assembly as set forth in claim 1 wherein said rail has a bottom wall and first and second opposing walls extending from said bottom wall such that said rail has a substantially U-shaped configuration with said bottom wall and said first and second opposing walls defining said rail channel.

10. The sliding window assembly as set forth in claim 1 wherein said at least one fixed panel is further defined as a single fixed panel, with said second edge of said single fixed panel defining an opening within said single fixed panel, with said rail adjacent said opening, and with said sliding panel movable relative to said single fixed panel between said open and closed positions along said rail and said rail axis to vary a size of said opening.

11. The sliding window assembly as set forth in claim 2 wherein said rail is rigid relative to said elongated member to structurally reinforce said elongated member.

12. The sliding window assembly as set forth in claim 1 wherein said raid axis is horizontal such that said sliding window assembly is a horizontal sliding window assembly.

13. The sliding window assembly as set forth in claim 1 wherein said at least one fixed panel is further defined as a first fixed panel and a second fixed panel spaced from said first fixed panel, wherein each fixed panel has a first edge and a second edge, with said rail coupled to each of said first and second fixed panels.

14. The sliding window assembly as set forth in claim 13 wherein said second edge of each of said first and second fixed panels partially defining an opening therebetween, with said sliding panel movable relative to said first and second fixed panels between said open and closed positions along said rail and said axis to vary a size of said opening.

15. The sliding window assembly as set forth in claim 14 wherein said rail extends between said first and second fixed panels and across said opening to facilitate said movability of said sliding panel relative to said first and second fixed panels between said open and closed positions along said rail and said axis to vary said size of said opening.

16. A sliding window assembly for a vehicle, said sliding window assembly comprising:

a first fixed panel and a second fixed panel spaced from said first fixed panel, with said first and second fixed panels adapted to be fixed to the vehicle, with each of said first and second fixed panels having a first edge and a second edge spaced from said first edge, with said second edge of each of said first and second fixed panels partially defining an opening therebetween, with each of said first and second fixed panels having an arcuate configuration about a horizontal axis of curvature and with each of said first and second fixed panels also having an arcuate configuration about a vertical axis of curvature, with said horizontal axis of curvature being substantially orthogonal to said vertical axis of curvature;

at least one track coupled to each of said first and second fixed panels and having a first track end and a second track end spaced from said first track end, with said track having an intermediate portion extending along a rail axis between said first and second track ends, with said rail axis including a rail defining a channel having a substantially linear configuration along said axis and an elongated member at least partially disposed between each of said first and second fixed panels and said rail to couple said rail to said first and second fixed panels; and a sliding panel at least partially disposed within said channel and movable along said rail and said rail axis such that said sliding panel moves relative to said first and second fixed panels between an open position and a closed position;

wherein said first edge and said second edge of each of said first and second fixed panels are spaced from one another along said rail axis that said rail extends along, and said elongated member has a thickness between each of said first and second fixed panels and said rail with said thickness decreasing from said intermediate portion of said track toward each of said first and second track ends such that said thickness varies along said rail axis to accommodate for said arcuate configuration of each of said first and second fixed panels; and wherein said rail axis is horizontal such that said sliding window assembly is a horizontal sliding window assembly.

* * * * *

UNITED STATES PATENT AND TRADEMARK OFFICE
CERTIFICATE OF CORRECTION

| | |
|---|---|
| PATENT NO. | : 9,463,684 B2 |
| APPLICATION NO. | : 14/700614 |
| DATED | : October 11, 2016 |
| INVENTOR(S) | : David W. Lahnala |

It is certified that error appears in the above-identified patent and that said Letters Patent is hereby corrected as shown below:

In the Claims

Claim 7, Column 12, Line 61, please delete "raid axis" and replace with -- rail axis --

Claim 12, Column 13, Line 16, please delete "raid axis" and replace with -- rail axis --

Claim 16, Column 14, Line 16, please delete "rail axis" and replace with -- track --

Signed and Sealed this
Thirtieth Day of May, 2017

Michelle K. Lee
*Director of the United States Patent and Trademark Office*